(12) United States Patent
Jagadeesan

(10) Patent No.: US 8,024,485 B2
(45) Date of Patent: Sep. 20, 2011

(54) COOPERATIVE COEXISTENCE OF MULTIPLE TIME SYNCHRONIZATION APPLICATIONS

(75) Inventor: Subramani Jagadeesan, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 224 days.

(21) Appl. No.: 12/336,943

(22) Filed: Dec. 17, 2008

(65) Prior Publication Data

US 2010/0153584 A1   Jun. 17, 2010

(51) Int. Cl.
    *G06F 15/16* (2006.01)
(52) U.S. Cl. .................... 709/248; 709/223; 709/225
(58) Field of Classification Search .............. 709/248, 709/223, 225
    See application file for complete search history.

(56) References Cited

U.S. PATENT DOCUMENTS

| 7,376,050 | B2 | 5/2008 | Yanase |
| 7,394,802 | B2 | 7/2008 | Jun et al. |
| 2007/0124503 | A1* | 5/2007 | Ramos et al. ............ 709/248 |
| 2007/0124504 | A1* | 5/2007 | McNealy et al. ......... 709/248 |
| 2008/0168185 | A1* | 7/2008 | Robbin et al. ............ 709/248 |

* cited by examiner

*Primary Examiner* — Le Luu

(57) ABSTRACT

The invention relates to systems and or methodologies for enabling cooperative coexistence of multiple time synchronization applications in handheld devices. More particularly, a time component that maintains a time value for a computing device, and a time synchronization component that interfaces with one or more communication entities, and selects one of the communication entities to set the time value in the computing device based on a set of criteria.

20 Claims, 9 Drawing Sheets

COOPERATIVE COEXISTENCE OF MULTIPLE TIME SYNCHRONIZATION APPLICATIONS

BACKGROUND

Mobile communication and computing technologies have experienced significant growth over the past several years. This growth has lead to mobile computing systems of increased sophistication and complexity. Additionally, the increased sophistication has allowed mobile computing devices to have a plurality of communication options. Mobile communication devices can connect to and communicate with wide area networks, wireless local area networks, global positioning satellites, proprietary synchronization applications, and various internet protocols.

This increased connectivity has allowed mobile computing devices to exchange information and data with a plurality of sources and applications. Processes that were one relegated to execution on larger and more expensive computers can now be shared across distributed networks. However, the increased connectivity can also lead to conflicts when multiple sources attempt to update data values on the computing device with conflicting data values.

Conflicts resulting from inconsistent data values can disrupt applications and processes executing on a computing device. Such disruptions can result in costly and inefficient downtime, glitches, and errors. Currently, mobile communication/computing devices may only allow one source to update a particular data value in order to avoid conflicts. However, it would be desirable to have a system and/or methodology of allowing, disallowing, or prioritizing the ability of multiple sources to update, set or otherwise synchronize one or more data values in a mobile computing/communication device.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The subject disclosure provides for the cooperative coexistence of multiple time synchronization applications. In some aspects, disclosed is a system facilitating time synchronization. The system includes at least one processor coupled to memory that executes computer-executable components, including a time component that maintains a time value for a computing device, and a time synchronization component that interfaces with one or more communication entities, and selects one of the communication entities to set the time value in the computing device based on one or more criteria.

In other aspects, disclosed is a method for facilitating time synchronization in a computing device. The method includes the steps of maintaining a time value for a computing device in a memory, interfacing the communication device with one or more communication entities, and prioritizing an order in which the communication entities are allowed to update the time value in the computing device based on one or more criteria.

According to still other aspects, provided is a system for time synchronization in mobile devices. The system includes means for maintaining a time value for a computing device in a memory, means for interfacing the communication device with one or more communication entities, wherein the communication entities include at least one of a wide area network, a wireless local area network, a set of global positioning satellites, a proprietary synchronization application, or one or more internet time protocols, and means for determining at least one communication entities that is allowed to update the time value in the computing device based on one or more criteria, the criteria including at least one of a set of user preferences, or a set of schemas.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
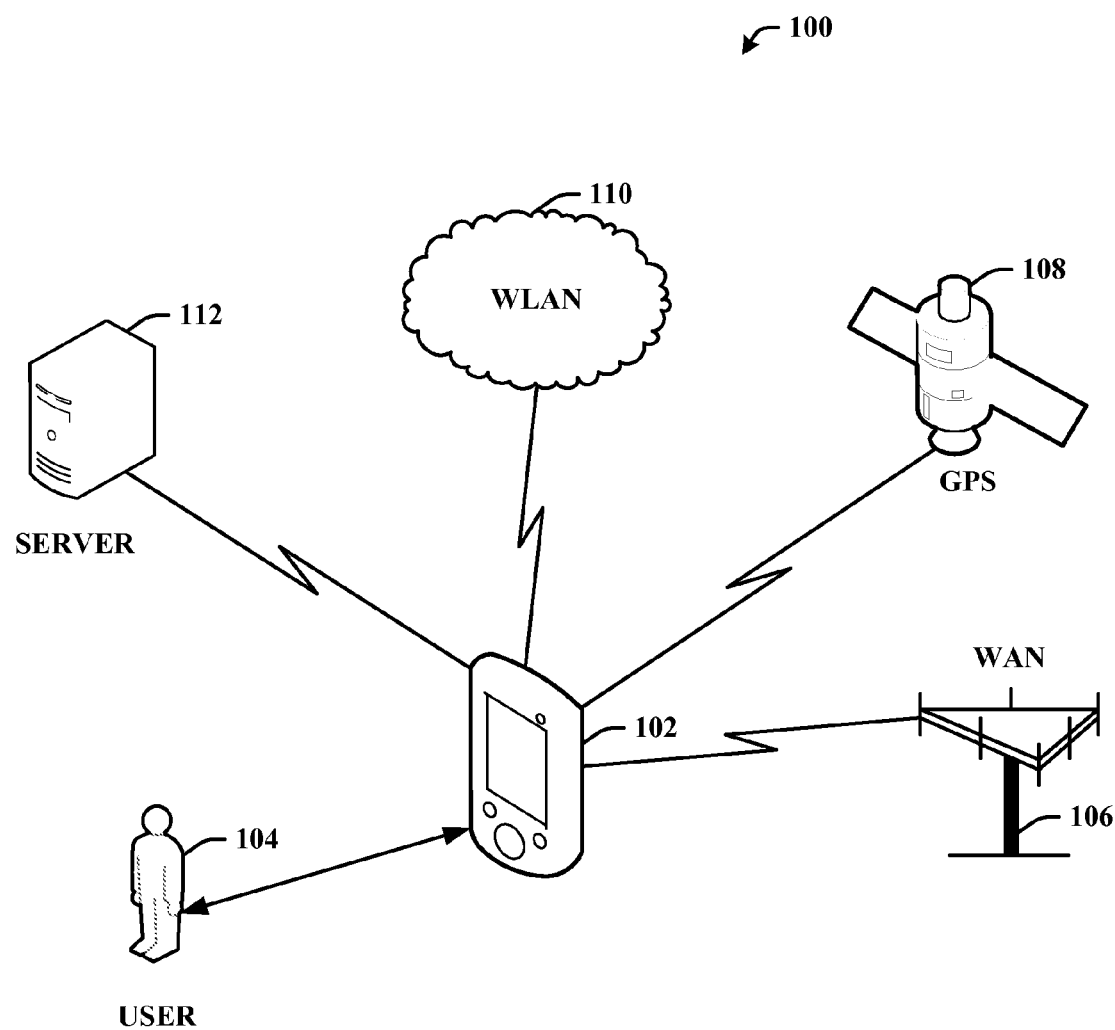
FIG. 1 illustrates an example mobile communication system in accordance with one or more aspects of the subject specification.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

FIG. 1 illustrates an example mobile communication system 100 in accordance with one or more aspects of the subject innovation. The system 100 includes a mobile device 102. The mobile device 102 can include devices such as cell phones, smart phones, laptops, handheld communication devices, handheld computing devices, satellite radios, global positioning systems, PDAs, and so forth. A user 104 can use the mobile device 102 for most any computing purpose, such as communication (e.g., voice, data, etc.), entertainment (e.g., games, music, video, etc.), business applications (e.g., word processing, inventory, employee control, spreadsheets, etc.), navigation, etc.

The mobile device 102 can be connected to a plurality of communication entities in order to provide the aforementioned functionality. For example, the mobile device 102 can be connected to a wide area network 106 (WAN), a set of GPS satellites 108, a wireless local area network 110 (WLAN), and/or a local server 112. The WAN 106, the WLAN 110, and the server 112 can enable the mobile device to connect to a communication framework, including but not limited to the internet, a mobile communication framework (e.g. GSM, CDMA, etc.), and so forth. The GPS satellites 108 can enable global positioning for the mobile device 102, and the server 112 can facilitate synchronizing the mobile device 102 with one or more external computer systems via most any proprietary sync application (e.g., MS ActiveSync).

The communication entities can each maintain their own time and date. For instance, at a time T1 the time maintained by the WAN server 106 may indicate that the time is T1$x$, the GPS satellites 108 may denote that the time as T1$y$, WLAN's 110 time can be T1$z$, and a proprietary sync application on the server 112 may indicate that the time is T1$w$. Therefore, the different times indicated by the communication entities may conflict with one another when attempting to update the time on the mobile device 102. It is to be appreciated that this is but one example, and a plurality of communication entities and time protocols are possible within the scope and spirit of the subject innovation.

Figure 2:
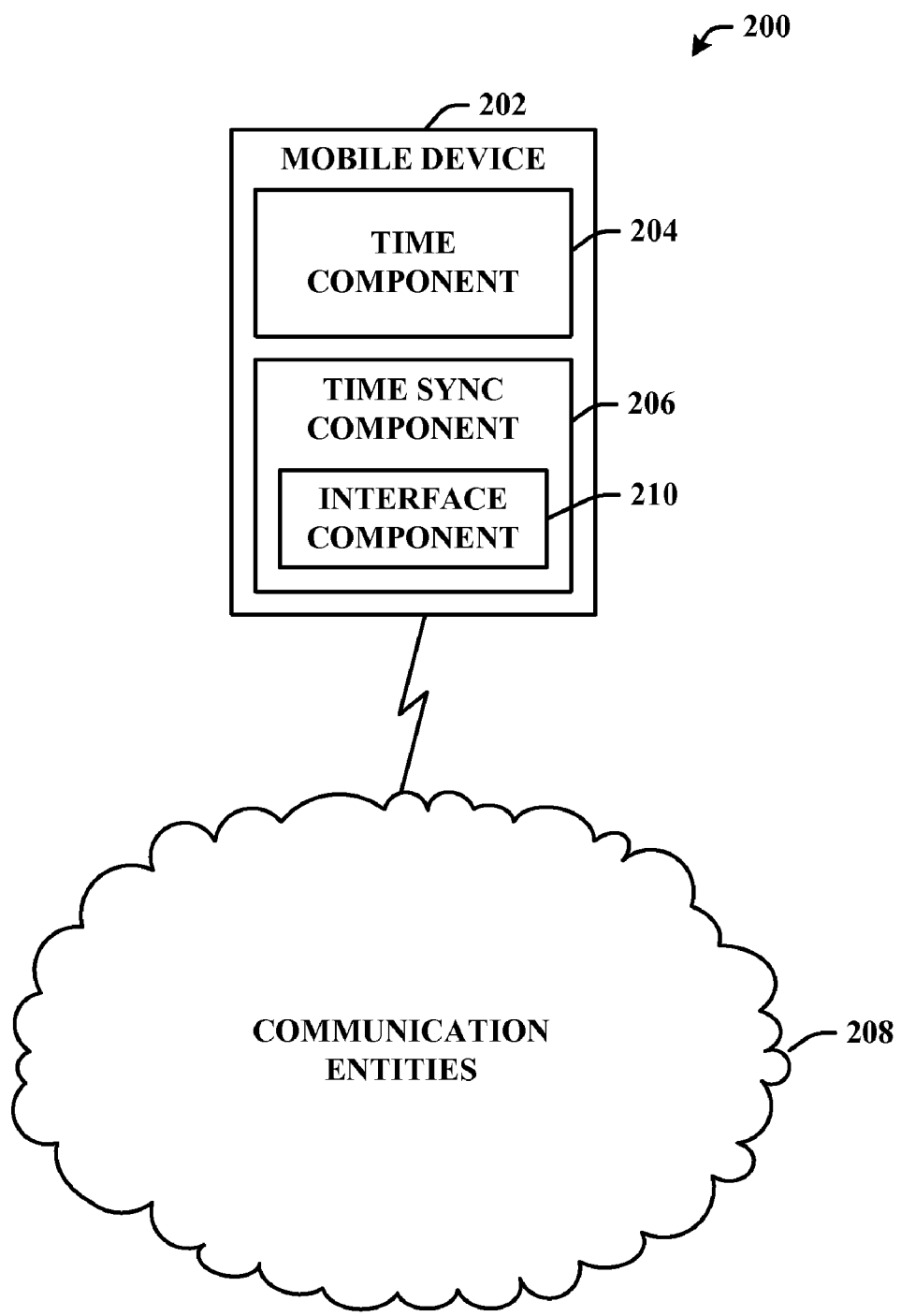
FIG. 2 illustrates an example general component diagram of a mobile communication system in accordance with an aspect of the subject specification.

FIG. 2 illustrates an example mobile communication system in accordance with an aspect of the subject innovation. The mobile system 200 includes a mobile device 202, having a time component 204, and a time synchronization component 206. As previously discussed, the mobile device 202 can be most any mobile computing apparatus, including but not limited to devices such as cell phones, smart phones, laptops, handheld communication devices, handheld computing devices, satellite radios, global positioning systems, PDAs, and so forth.

The time component 204 maintains a time value for the mobile device 202. For example, the mobile device 202 can have a time value X that is updated (e.g., synchronized) via one or more communication entities 208 (discussed supra). The time component 204 can compare the time value from a time source (e.g., communication entity) and the system (e.g., mobile device) time. If there is a difference, then the time component 204 can update the system time using the time source. For instance, the time component 204 receives a time value as 4:25 pm and the system time is 4:15 pm, then it will set the system time as 4:25 pm.

The time synchronization component 206 includes an interface component 210 that enables the time synchronization component 206 to synchronize the mobile device's 202 time value with one or more communication entities 208, such as a WLAN, a set of GPS satellites, a WAN, one or more proprietary synchronization applications, an internet time protocol, and so forth. However, the entities 208 work independently of one another, and may attempt to update the time value of the mobile device 202 simultaneously. This can result in conflicts when the entities 208 contain differing time values (as previously noted). The time sync component 206 can militate against such conflicts by requiring the entities 208 to register with the time sync component 206, and prioritizing, allowing, and/or disallowing, one or more communication entities 208 from synchronizing time values with the mobile device 202 based on one or more criteria. The criteria can include but are not limited to one or more schemas, and/or a set of user preferences. For example, a user can determine that the mobile device's time value can only be updated by a WAN (e.g., GSM/CDMA). It is to be appreciated that this is but one example, and the system is illustrated as such for clarity and ease of explanation.

Figure 3:
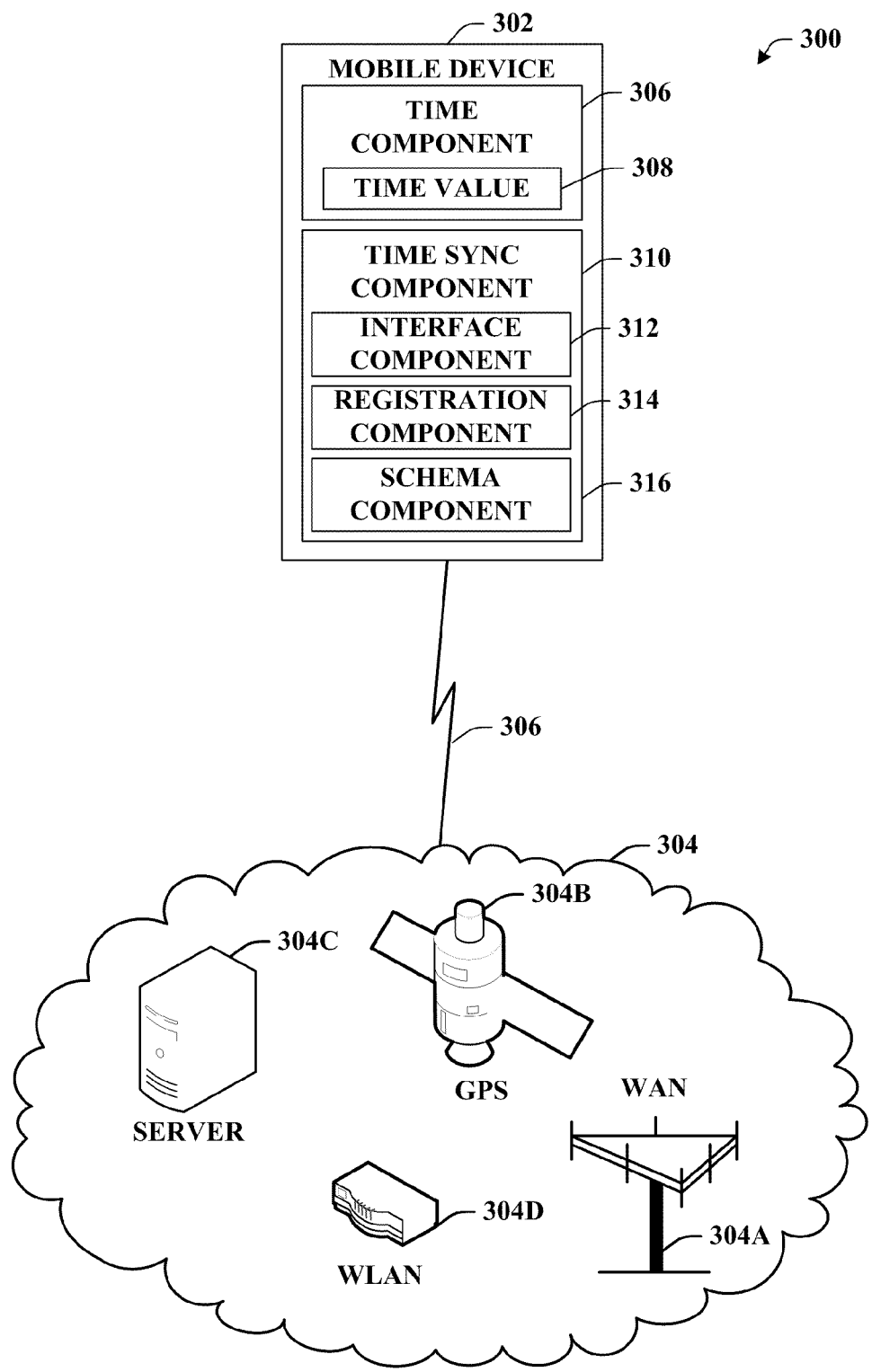
FIG. 3 illustrates an example general component diagram of a mobile communication system in accordance with an aspect of the subject specification.

FIG. 3 illustrates an example mobile communication system in accordance with an aspect of the subject innovation. The system 300 includes a mobile device 302 and a set of communication entities 304. The mobile device 302 can connect, communicate, or otherwise transfer data between the communication entities 304 via a communication link 306. The communication link 306 can be a wireless connection, a wired connection, or most any suitable data connection. The communication entities 304 can include but are not limited to a wireless area network 304A (WAN), a set of GPS satellites 304B, a network server 304C, and/or a wireless local area network (WLAN) 304D. The entities can enable the mobile device 302 to communicate with one or more communication infrastructures, such as the internet, a local network, a GSM/CDMA network, and so forth. Each of the entities 304 can maintain an independent time value that can be used at least in part to update a time value for user equipment (e.g. mobile devices 302).

The mobile device 302 includes a time component 306 that maintains a time value 308, wherein the time value 308 can be comprised of hours, minutes, seconds, dates, and/or day of the week values. The time value 308 can be used by the mobile device 302 as a system time for most any application or process requiring a time value. For example, the mobile device 302 may have a calendar application that reminds users of events based at least in part on the current date and time.

In addition, the mobile device 302 includes a time synchronization component (time sync component) 310 having an interface component 312, a registration component 314, and a schema component 316. The interface component 312 enables the time synchronization component 310 to receive, acquire, or otherwise obtain time values from one or more entities 304. In addition, the time sync component 310 can require each of the entities to register with a registration component 314, and query the time sync component 310 before setting the time value 308. The time sync component 310 can prioritize, allow, or disallow the entities 304 from setting the time value 308 based on one or more criteria maintained in the schema component 316.

The schema component 316 can obtain, learn, or otherwise determine a set of schema for enabling the entities 304 to set the time value. For example, the schema component 316 can infer a schema based on consistent user preferences, such as where a user typically allows the WAN 304A to set the set time value 308 during a first situation, and the GPS 304B to set the time value during a second situation, and so forth. In addition, the schema component 316 can have one or more predetermined schemas. For example, the schema component 316 can include a schema that allows the most available entity 304 to set the time value 308. For instance, if the mobile device 302 is executing a navigation application via communication with the GPS satellites 304B, then it may be desirable to allow the GPS satellites 304B to set the time value 308. Additionally or alternatively, the schema component 316 can enable a user to select which of the entities 304 is allowed to set the time value 308. For instance, a user may have a preference for the time maintained by the WAN 304A.

The time sync component 310 can avoid conflicts caused by multiple entities 304 attempting to set the time value 308 using disparate values by allowing only one entity 304 to set the time value at any given time. It is to be appreciated that this is but one example, and a plurality of configurations and techniques are possible within the scope and spirit of the subject innovation.

Figure 4:
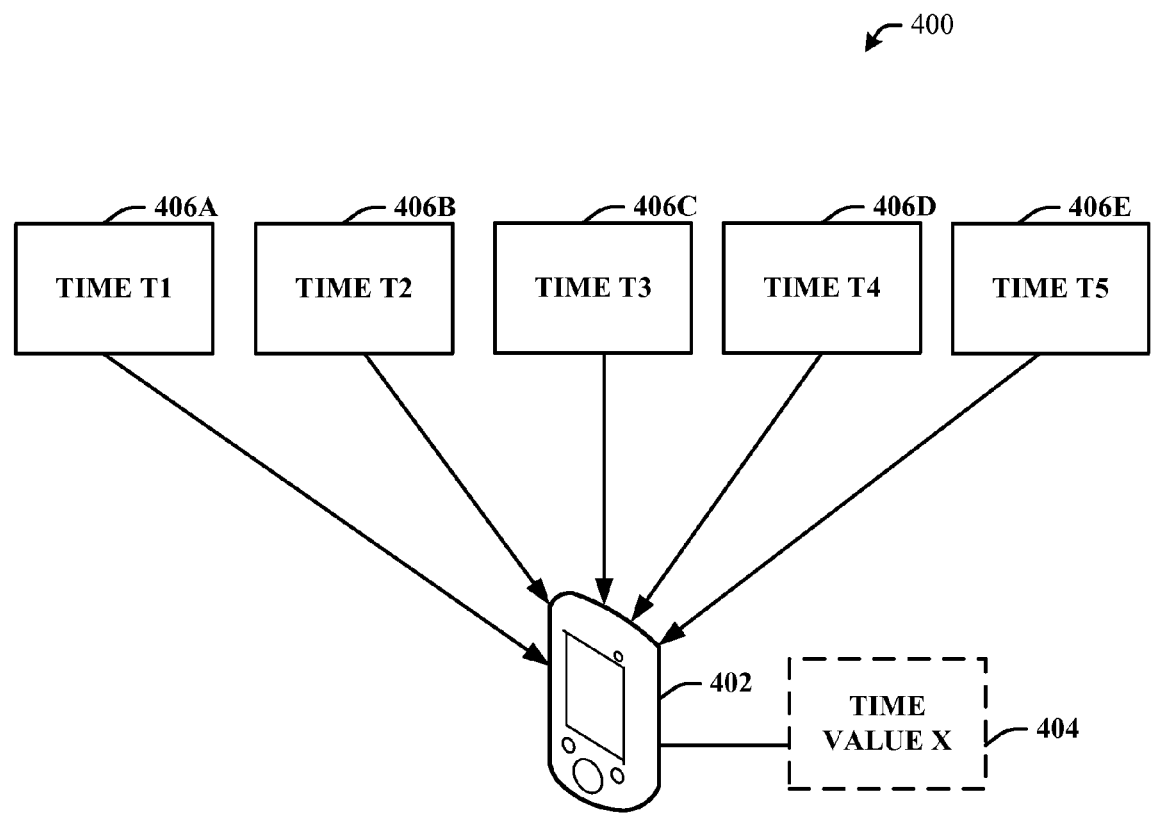
FIG. 4 illustrates an example general component diagram of time synchronization in a communication system in accordance with an aspect of the subject innovation specification.

Referring to FIG. 4, an example communication system is illustrated in accordance with an aspect of the subject innovation. The system 400 includes a mobile device 402 having a time value X 404. The mobile device 402 can include most any mobile computing apparatus, including but not limited to devices such as cell phones, smart phones, laptops, handheld communication devices, handheld computing devices, satellite radios, global positioning systems, PDAs, and so forth (discussed supra). In addition, the time value X 404 can be used by the mobile device 402 as a system time for most any application or process requiring a time value. For example, the mobile device 402 can execute a navigation program that calculates/estimates the time of a trip, and can produce an estimated time of arrival (ETA) based on the current value of the time value 404.

The time value 404 can be updated, synchronized, or otherwise set by most any time source 406 (e.g. 406A-E). The time sources 406 can include but are not limited to an internet time protocol (e.g., network time protocol, daytime, time, etc.), a set of global positioning satellites (GPS), a wireless local area network (WLAN), a wide area network (WAN), and/or a proprietary synchronization application (e.g., MS ActiveSync). However, conflicts can arise when more than one time sources 406 concurrently attempt to set the time value 404 of the mobile device 402. For example, as illustrated each of the time sources 406 can have a different time value, such as a first source 406A has a time value T1, a second source 406B has a time value T2, a third source 406C has a time value T3, a fourth source 406D has a time value T4, and a fifth source 406E has a time value of T5.

Clearly, each of the sources 406 cannot set the time value X 404 to reflect their own time value, because the values are conflicting. Consequently, the conflicting time values of the sources 406 can result in computational errors within the mobile device 402 if allowed to update the time value X 404. It is to be appreciated that time value X 404 can be include values for hours, minutes, seconds, dates, and/or a day of the week. Additionally, it is to be appreciated that this is example is illustrated for brevity and ease of explanation, and any number of time sources having a plurality of time values are possible within the scope and spirit of the subject innovation.

Figure 5:
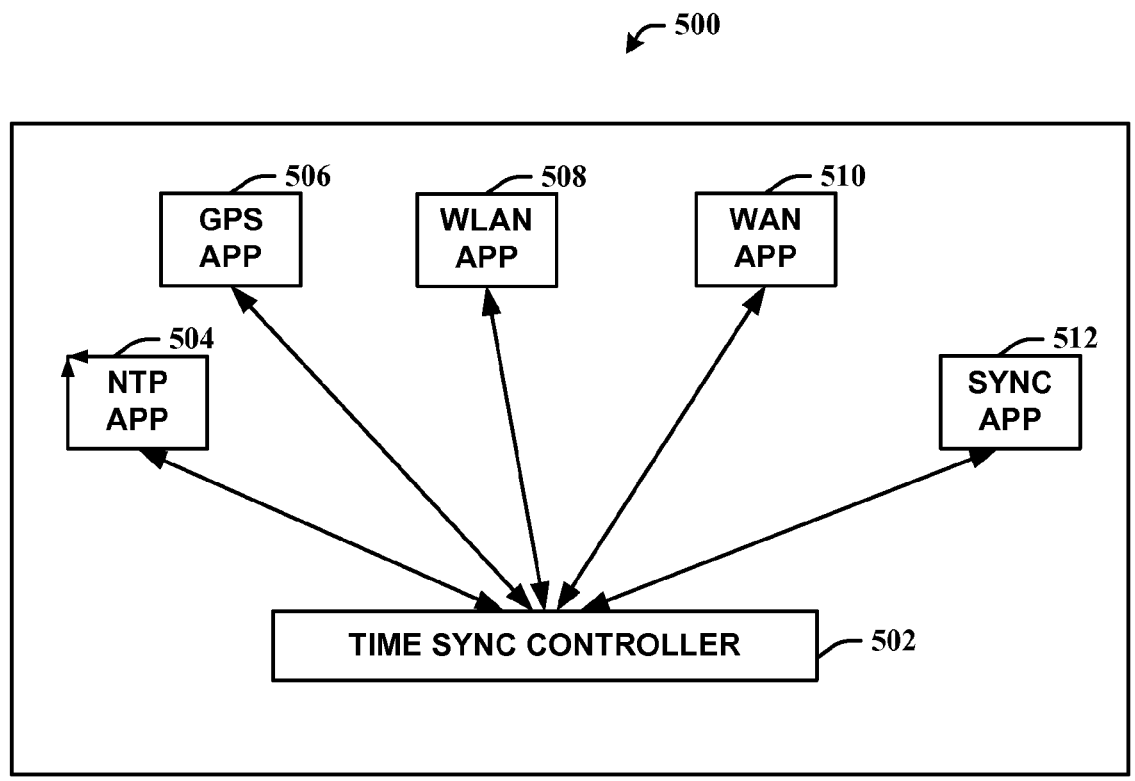
FIG. 5 illustrates an example block diagram of a time synchronization controller for a mobile communication system in accordance with an aspect of the subject specification.

Turning now to FIG. 5 an example general component block diagram of a system 500 for cooperative coexistence of various time synchronization applications is shown in accordance with an aspect of the subject innovation. The system 500 includes a time synchronization controller 502. The time sync controller 502 can coordinate the synchronization efforts of a plurality of synchronization applications (e.g., app), including but not limited to a network time protocol (NTP) app 504, a global positioning satellite (GPS) app 506, a wireless local area network (WLAN) app 508, a wide area network (WAN) app 510, and/or a proprietary synchronization (sync) app 512 (e.g., MS ActiveSync, etc.).

The time sync controller 502 can be included in mobile devices (discussed previously), such as cell phones, smart phones, laptops, handheld communication devices, handheld computing devices, satellite radios, global positioning systems, PDAs, and so forth. The time sync controller 502 requires the apps 504-512 to register with itself, and send a query when the time needs to be updated. Otherwise, the apps 504-512 may attempt to set the time of the mobile device simultaneously, wherein each may have a different time. In addition, the apps 504-512 must query the time sync controller 502 before attempting to set the time, and the time sync controller 502 can respond to the queries by either accepting or rejecting the app's 504-512 request to set the time based on one or more user preferences and/or schemas (discussed supra).

Figure 6:
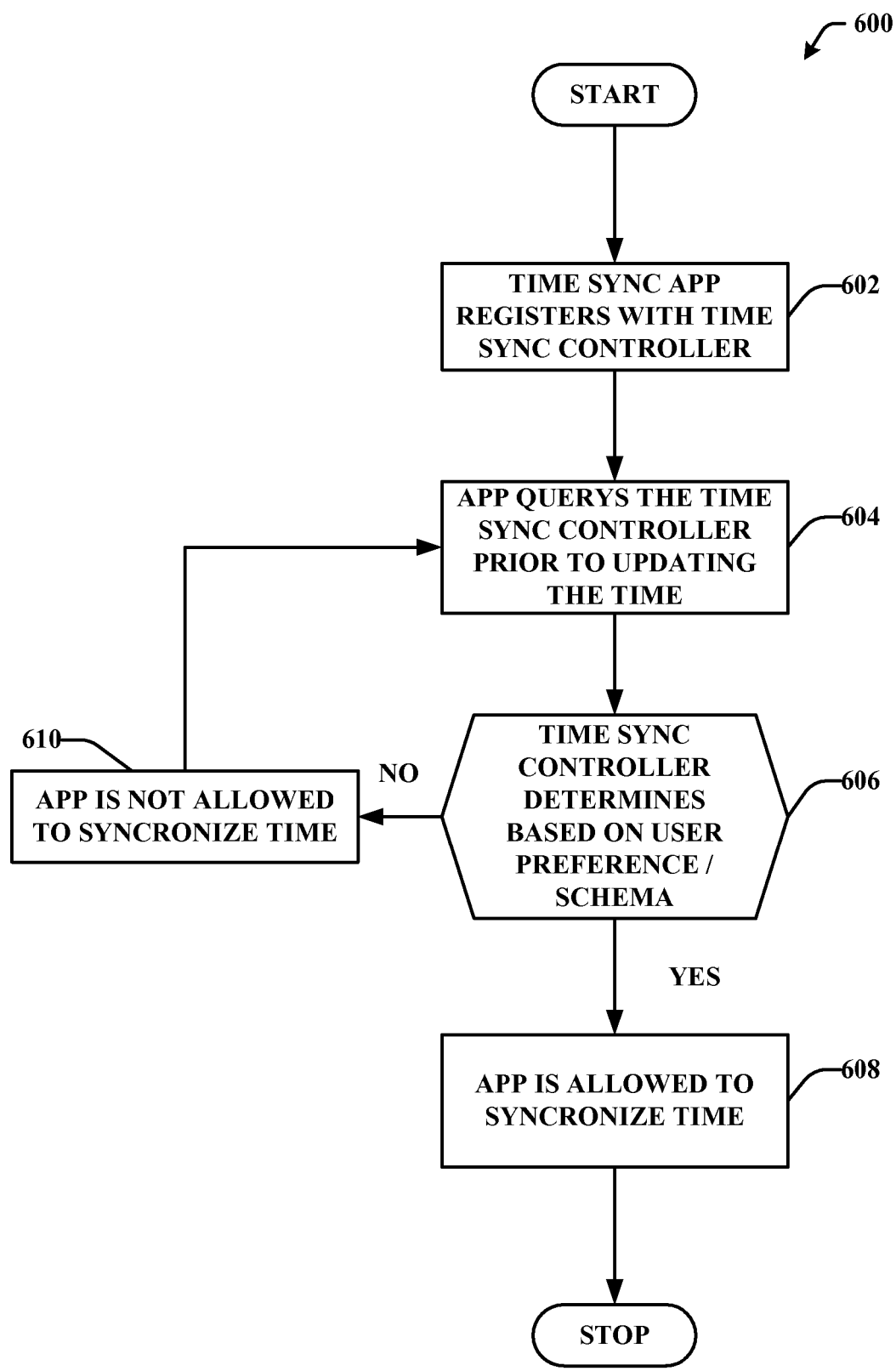
FIG. 6 illustrates an example methodology for enabling cooperative coexistence of time synchronization applications in accordance with an aspect of the subject specification.

In view of the exemplary systems and techniques described supra, a methodology that may be implemented in accordance with the disclosed subject matter will be better appreciated with reference to the flow chart of FIG. 6. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

Referring now to FIG. 6, an example method for cooperative coexistence of various time synchronization applications is shown in accordance with an aspect of the subject innovation. At 602, a first time synchronization application registers a time sync controller. As discussed previously, the time synchronization application can be associated with most any communication framework, and can include but is not limited to a network time protocol (NTP) application, a global positioning satellite (GPS) application, a wireless local area network (WLAN) application, a wide area network (WAN) application, and/or a proprietary synchronization (sync) application such as MS ActiveSync, and so forth.

At 604, the synchronization application queries the time sync controller for permission to set the time on the mobile device (e.g., synchronize the time). At 606, the time sync controller determines based on one or more user preferences and/or schemas whether to allow the mobile device to set the time. For example, a NTP application can be registered with the mobile device, and query the device for permission to set the time. If the time sync controller determines the synchronization application does have permission to set the device time, then at 608 the synchronization sets the device time. If the time sync controller determines that the synchronization application does not have permission to set the device time, then at 610 the application's request is denied, and the app will have to query the device again in order to set the time. Continuing with the previous example, a user may have determined that the time on the mobile device should be set by their wide area network (WAN) service provider (e.g., GSM/CDMA). Consequently, the request by the NTP application to set the time will be denied by the mobile device. Additionally or alternatively, a wait state or some other mechanism can be employed to prevent the applications from constantly querying the device.

Figure 7:
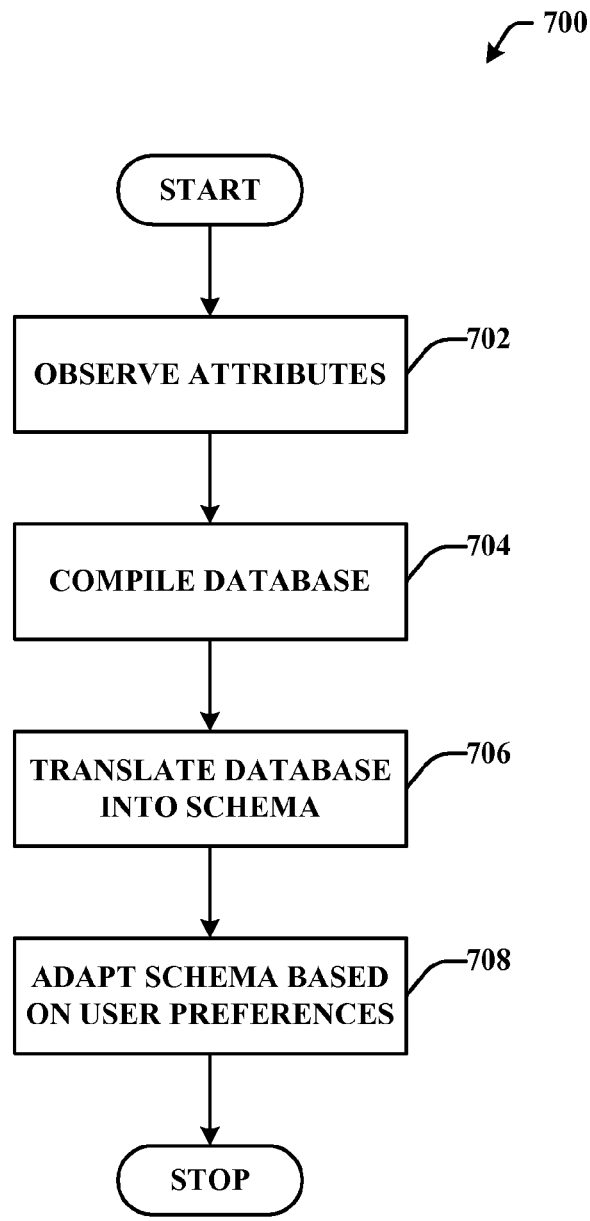
FIG. 7 illustrates an example methodology of producing a schema for cooperative coexistence of time synchronization applications in accordance with an aspect of the subject specification.

FIG. 7 illustrates an example method for learning and creating time synchronization schemas for mobile devices in accordance with an aspect of the subject innovation. As previously discussed, one or more schemas can be created based on typical or desired user preferences. At 702, one or more attributes are observed. For example, the attributes can include active applications, time of day, location, and the entity updating the mobile device. The attributes can be observed via a background application running on mobile device for a predetermined period of time. For example, the background application may track the attributes during an initialization phase when the mobile device is originally activated. Additionally or alternatively, the application can continuously track the attributes, or can be activated by a user or the mobile device as desired.

At 704, the observed attributes are compiled into a database. The database can have various levels of granularity, and can include a plurality of attributes. For example, a first attribute may be a day, wherein the day can be expressed as weekdays compared to weekends, or the specific day of the week, such as Monday. At 706, the database is translated into a set of logic devices, such as a schema. As previously discussed, the schema facilitates the mobile device in determining which entity can set the device time. Additionally or alternatively, the database could be translated into a plurality of other logical devices such as a probability table, wherein the mobile device can determine which entity can set the device time based on the probability of an event above or below a threshold.

At 708, the schema is adapted based on user or mobile device preferences or trends. As previously discussed, the attributes and device states can be monitored, and the schema updated to reflect actual usage requirements. It is to be appreciated that the foregoing is but one example of creating a time synchronization schema, and a plurality of techniques are possible within the scope and spirit of the subject innovation.

Figure 8:
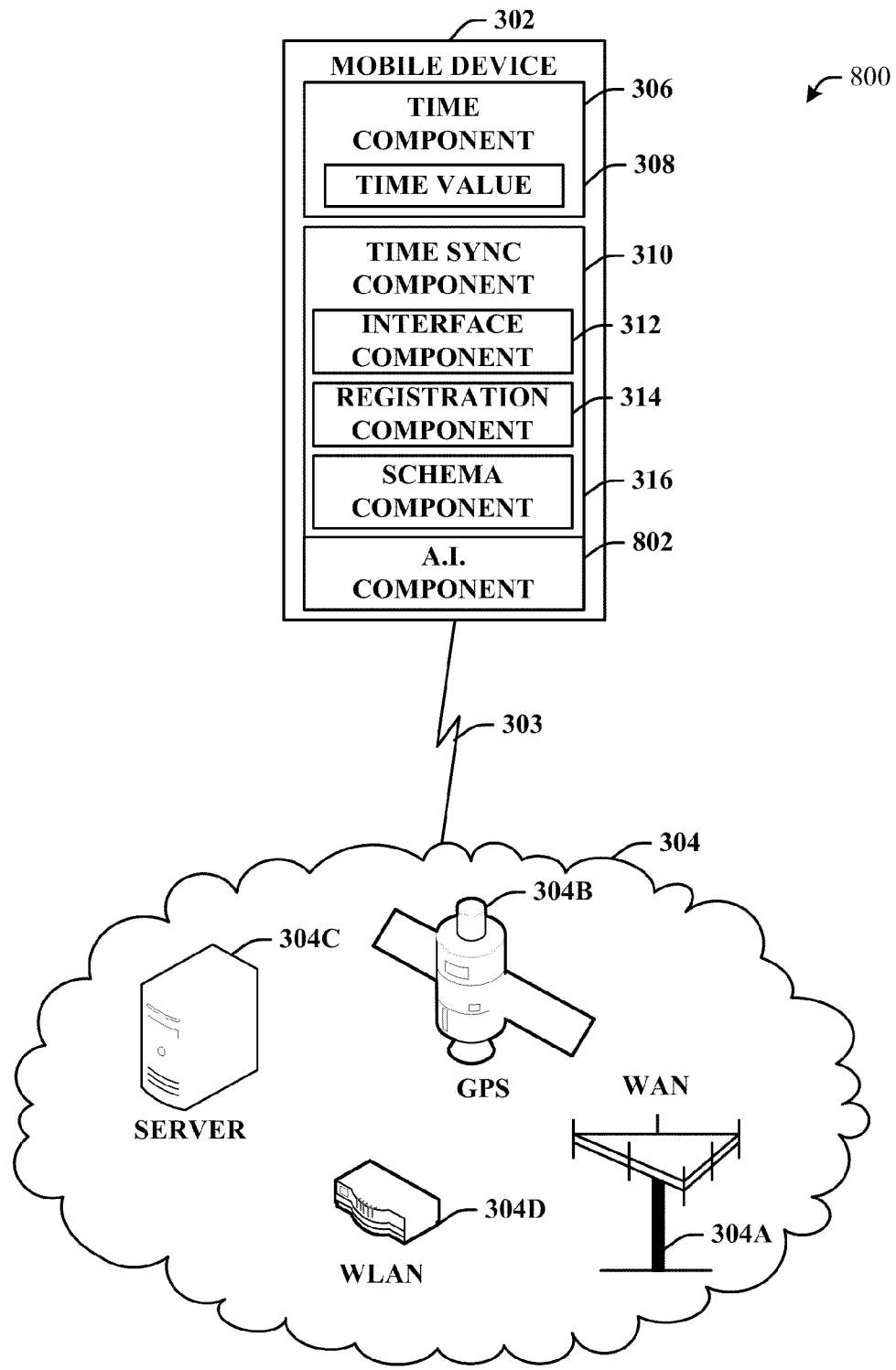
FIG. 8 illustrates a system that employs an artificial intelligence component that facilitates automating one or more features in accordance with the subject specification.

FIG. 8 illustrates a system 800 that employs an artificial intelligence (AI) component 802 that facilitates automating one or more features in accordance with the subject invention. The subject invention (e.g., in connection with inferring) can employ various AI-based schemes for carrying out various aspects thereof. For example, a process for prioritizing, allowing, or disallowing a set of synchronization applications to set the time on a mobile device can be facilitated via an automatic classifier system and process.

A classifier is a function that maps an input attribute vector, $x=(x1, x2, x3, x7, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 9:
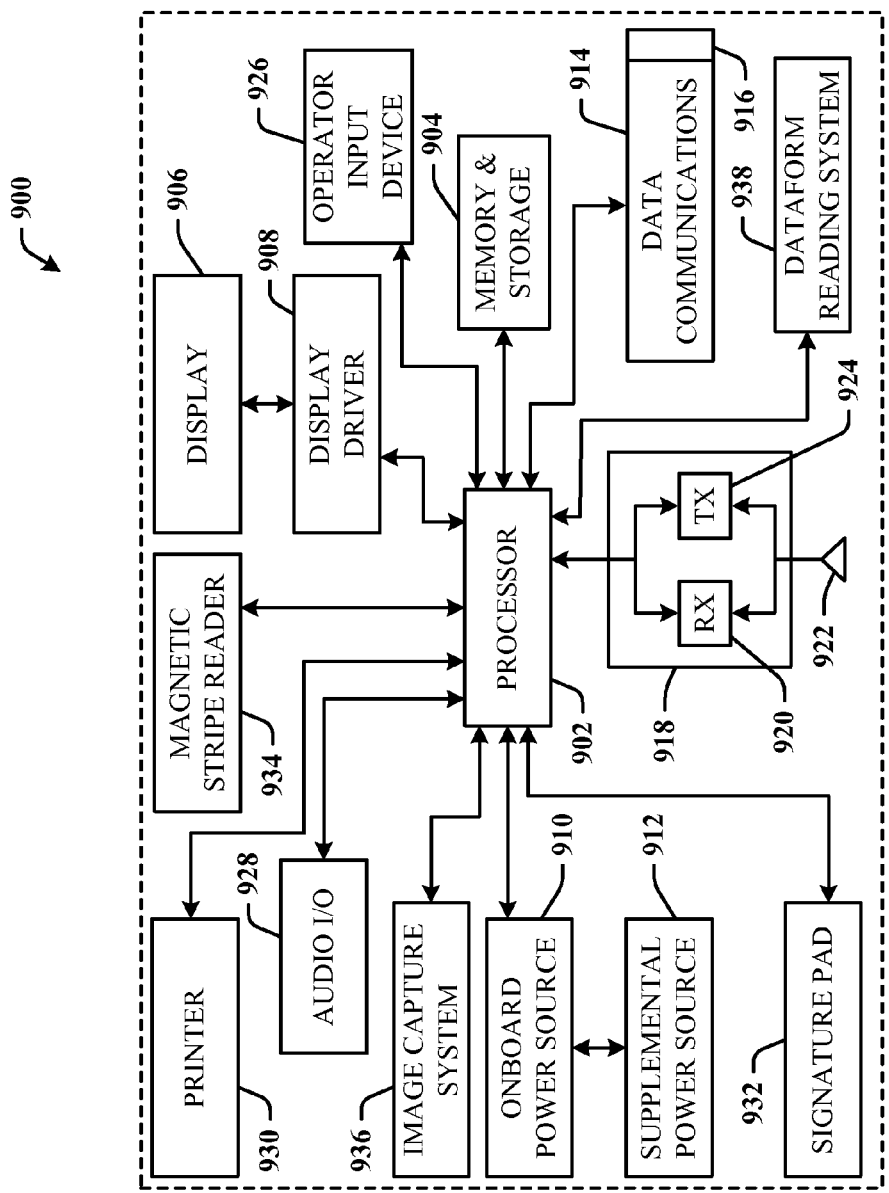
FIG. 9 illustrates an exemplary device operative to execute the one or more embodiments disclosed herein.

Referring now to FIG. 9, illustrated is a schematic block diagram of a portable hand-held terminal device 900 according to one aspect of the invention, in which a processor 902 is responsible for controlling the general operation of the device 900. The processor 902 is programmed to control and operate the various components within the device 900 in order to carry out the various functions described herein. The processor 902 can be one or more of any of a plurality of suitable processors. The manner in which the processor 902 can be programmed to carry out the functions relating to the invention will be readily apparent to those having ordinary skill in the art based on the description provided herein.

A memory 904 connected to the processor 902 serves to store program code executed by the processor 902, and serves as a storage means for storing information such as user credential and receipt transaction information and the like. The memory 904 can be a nonvolatile memory suitably adapted to store at least a complete set of the information that is displayed. Thus, the memory 904 can include a RAM or flash memory for high-speed access by the processor 902 and/or a mass storage memory, e.g., a micro drive capable of storing gigabytes of data that comprises text, images, audio, and video content. According to one aspect, the memory 904 has sufficient storage capacity to store multiple sets of information, and the processor 902 could include a program for alternating or cycling between various sets of display information.

A display 906 is coupled to the processor 902 via a display driver system 908. The display 906 can be a color liquid crystal display (LCD), plasma display, or the like. In this example, the display 906 is a ¼ VGA display with sixteen levels of gray scale. The display 906 functions to present data, graphics, or other information content. For example, the display 906 can display a set of customer information, which is displayed to the operator and can be transmitted over a system backbone (not shown). Additionally, the display 906 can display a variety of functions that control the execution of the device 900. The display 906 is capable of displaying both alphanumeric and graphical characters.

Power is provided to the processor 902 and other components forming the hand-held device 900 by an onboard power system 910 (e.g., a battery pack). In the event that the power system 910 fails or becomes disconnected from the device 900, a supplemental power source 912 can be employed to provide power to the processor 902 and to charge the onboard power system 910. The processor 902 of the device 900 induces a sleep mode to reduce the current draw upon detection of an anticipated power failure.

The terminal 900 includes a communication subsystem 914 that includes a data communication port 916, which is employed to interface the processor 902 with a remote computer. The port 916 can include at least one of Universal Serial Bus (USB) and IEEE 1394 serial communications capabilities. Other technologies can also be included, for example, infrared communication utilizing an infrared data port.

The device 900 can also include a radio frequency (RF) transceiver section 918 in operative communication with the processor 902. The RF section 918 includes an RF receiver 920, which receives RF signals from a remote device via an antenna 922 and demodulates the signal to obtain digital information modulated therein. The RF section 918 also includes an RF transmitter 924 for transmitting information to a remote device, for example, in response to manual user input via a user input device 926 (e.g., a keypad) or automatically in response to the completion of a transaction or other predetermined and programmed criteria. The transceiver section 918 facilitates communication with a transponder system, for example, either passive or active, that is in use with product or item RF tags. The processor 902 signals (or pulses) the remote transponder system via the transceiver 918, and detects the return signal in order to read the contents of the tag memory. In one implementation, the RF section 918 further facilitates telephone communications using the device 900. In furtherance thereof, an audio I/O section 928 is provided as controlled by the processor 902 to process voice input from a microphone (or similar audio input device) and audio output signals (from a speaker or similar audio output device).

In another implementation, the device 900 can provide voice recognition capabilities such that when the device 900 is used simply as a voice recorder, the processor 902 can facilitate high-speed conversion of the voice signals into text content for local editing and review, and/or later download to a remote system, such as a computer word processor. Similarly, the converted voice signals can be used to control the device 900 instead of using manual entry via the keypad 926. For example, voice identification can be used to enable a switch from general mode to payment mode (or payment mode to general mode). It is to be appreciated that this is but one example, and a plurality of security measures, such as biometrics, can be used to enable a switch, including but not limited to fingerprint detection, facial recognition, iris recognition, and so forth.

Onboard peripheral devices, such as a printer 930, signature pad 932, and a magnetic strip reader 934 can also be provided within the housing of the device 900 or accommodated externally through one or more of the external port interfaces 916.

The device 900 can also include an image capture system 936 such that the user can record images and/or short movies for storage by the device 900 and presentation by the display 906. Additionally, a dataform reading system 938 is included for scanning dataforms. It is to be appreciated that these imaging systems (936 and 938) can be a single system capable of performing both functions.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system facilitating time synchronization, comprising:
at least one processor coupled to memory that executes the following computer-executable components:
a time component that maintains a time value for a computing device;
a time synchronization component that registers each of a plurality of communication entities, and prioritizes each of the plurality of communication entities to set the time value in the computing device based on one or more criteria, the time synchronization component receiving a query from at least one of the plurality of communication entities requesting permission to set the time value.

2. The system of claim 1, the criteria include at least one of a set of user preferences, a set of schemas, or artificial intelligence.

3. The system of claim 2, the user preferences are explicitly set by a user of the computing device.

4. The system of claim 2, the schemas are at least one of explicitly determined, or inferred.

5. The system of claim 1, the time synchronization component further includes a registration component that requires the communication entities to register with the device before attempting to set the time.

6. The system of claim 5, the time synchronization component obtains a query from two or more of the plurality of communication entities to set the time value of the computing device.

7. The system of claim 6, the time synchronization component responds to a query with at least one of an allow or disallow message.

8. The system of claim 1, wherein the communication entities include at least one of a wide area network, a wireless local area network, a set of global positioning satellites, a proprietary synchronization application, or one or more internet time protocols.

9. A method for facilitating time synchronization in a computing device, comprising:
- maintaining a time value for a computing device in a memory;
- registering each of a plurality of time sources with the computing device;
- prioritizing an order in which each of the plurality of time sources are allowed to set the time value in the computing device based on one or more criteria; and
- receiving a query from at least one of the time sources requesting permission to set the time value of the computing device.

10. The method of claim 9, the criteria include at least one of a set of user preferences, or a set of schemas.

11. The method of claim 10, further comprising determining the user preferences or schema via explicit user input.

12. The method of claim 10, further comprising determining the criteria via artificial intelligence.

13. The method of claim 9, further comprising requiring the time sources to register with the computing device prior to allowing the time sources to update the time value.

14. The method of claim 9, further comprising receiving a query from two or more of the plurality of time sources requesting permission to set the time value of the computing device.

15. The method of claim 14, further comprising responding to the query with at least one of an acceptance or rejection.

16. The method of claim 9, wherein the communication entities include at least one of a wide area network, a wireless local area network, a set of global positioning satellites, a proprietary synchronization application, or one or more internet time protocols.

17. A system for time synchronization in mobile devices, comprising:
- means for maintaining a time value for a computing device in a memory;
- means for registering each of a plurality of communication entities with the computing device, wherein the communication entities include at least one of a wide area network, a wireless local area network, a set of global positioning satellites, a proprietary synchronization application, or one or more internet time protocols; and
- means for prioritizing an order in which each of the plurality of communication entities is allowed to set the time value in the computing device based on one or more criteria, the criteria including at least one of a set of user preferences, or a set of schemas; and
- means for receiving a query from at least one of the communication entities requesting permission to set the time value of the computing device.

18. The system of claim 17, further comprising means for requiring the communication entities to register with the computing device prior to allowing the communication entities to update the time value.

19. The system of claim 18, further comprising means for responding to the query with at least one of an accept or reject message.

20. The system of claim 17, further comprising means for determining the criteria via artificial intelligence.

* * * * *